United States Patent

[11] 3,576,299

[72] Inventor Thomas F. Hanson
24204 Heritage Lane, Newhall, Calif. 91321
[21] Appl. No. 729,796
[22] Filed May 16, 1968
[45] Patented Apr. 27, 1971

[54] DIRECTION CONTROL SYSTEM
3 Claims, 2 Drawing Figs.

[52] U.S. Cl. .................................................. 244/17.19, 244/17.21
[51] Int. Cl. .................................................. B64c 27/22
[50] Field of Search............................................ 244/17.17, 17.25, 17.27; 170/135.4, 135.7, 135.27, 135.75, 135.23; 192/18; 244/17.13; 244/17.19, 17.11, 17.21, 17.23

[56] References Cited
UNITED STATES PATENTS

| | | | |
|---|---|---|---|
| 1,673,232 | 6/1928 | De La Cierva................ | 170/135.23X |
| 2,384,516 | 9/1945 | Young.......................... | 244/17.13X |
| 2,394,513 | 2/1946 | De Chappedelaine ....... | 170/135.4 |
| 2,511,133 | 6/1950 | Spase........................... | 192/18 |
| 2,619,207 | 11/1952 | Smith........................... | 192/18 |
| 2,644,533 | 7/1953 | Maillard et al................ | 244/17.19X |

Primary Examiner—Milton Buchler
Assistant Examiner—Paul E. Sauberer
Attorney—Daniel T. Anderson ABSTRACT: The specification discloses an airborne vehicular, direction control system. The example shown is an autogyro having a rotary wing and a substantially conventional propeller propulsion system. The rotor may be coupled to the propulsion system for VTOL and STOL modes of operation but is otherwise generally free wheeling. For direction or yaw control in flight a separate flywheel is provided internally of the vehicular body having angular momentum coupleable to the rotor in the same rotational sense with respect to the vehicular body. The direction control is then effected by means which selectively couple angular momentum to the rotor from the flywheel to achieve a yaw effect in one sense or from the rotor to the body, by braking means between the rotor and the body, to achieve a yaw effect in the opposite sense.

PATENTED APR 27 1971 3,576,299

Thomas F. Hanson
INVENTOR.

BY
Daniel T. Anderson
ATTORNEY

Thomas F. Hanson
INVENTOR.

DIRECTION CONTROL SYSTEM

BACKGROUND OF INVENTION

1. Field of the Invention

The invention relates generally to novel attitude control apparatus and method for bodies in a fluid or nonfluid, i.e. coacting or noncoacting, environment and more particularly to yaw or direction control for navigating vehicles which control does not depend for effect upon direct coaction with the environment.

Although the present invention exhibits particularly useful application in the field of autogyrolike STOL aircraft; and although, in the causes of clarity and brevity, much of the following discussion and description of examples of the invention are directed theretoward, it is expressly to be understood that the advantages of the invention are equally well manifest in other fields and in other modes of air and space navigation wherein it is desirable and advantageous to achieve attitude control independently of particular reactions upon environmental media or structure. Such other fields include, for example, space vehicles, helicopters, marine and submarine vehicles, ground effect machines, and the like.

2. Discussion of the Prior Art

With regard then particularly to VTOL and STOL (vertical and short take off and land, respectively) aircraft wherein the vehicle may be airborne with little or no forward velocity and hence be incapable at critical times of adequate or satisfactorily sensitive yaw control by action and reactions associated with conventional attitude control surfaces such as a vertical stabilizer and rudder, prior art solutions have typically been directed toward complex, costly or otherwise less than satisfactory devices and systems. It is particularly conventional in the helicopter art to provide a body appendage in the form of a tail boom upon which is mounted a laterally directed propeller for achieving a variable yaw control torque. When the rotary wing system is mechanically driven by an engine within the airframe, such a torque producing means is, of course, also useful in compensating continuously for any yaw producing torque reaction on the body from the rotor drive. The machinery and control systems required for such yaw control booms are complex and costly to manufacture and maintain. Furthermore, their complexity increases inherently their probability of failure. In addition, to obtain an adequate torque couple or moment, the boom must be long or the propeller thrust must be large; optimizing toward the former creates severe aesthetic limitations and disadvantages while the latter requires the expenditure of power and the creation of a higher operational noise level. Any optimization of these factors, however, results in a significant magnitude of drag during a high forward velocity mode of operation and requires additional personnel safety considerations when the craft is on or near the ground.

In addition, yaw control in such systems depends upon the engine being in operation and inherently requires a continuous consumption of power. Another and less obvious disadvantage of such systems in general is that the pilot operator is not provided inherently with a feedback signal from the control system; rather he must depend upon other senses or be provided with an artificial feedback feel.

Other approaches toward solving these attitude control problems have resulted in providing thrust producing jets, jet or rocket stream or propwash deflectors, and rudderlike elements; however, each of these types of systems are subject to the disadvantages discussed above or they depend for effect upon a coacting environmental medium; and their control sensitivity is a function of the magnitude of the crafts's velocity through the medium.

Accordingly, it is an object of the present invention to provide novel attitude control apparatus and method which are not subject to these and other disadvantages and limitations of the prior art.

It is another object to provide such apparatus which functions at zero forward velocity and whose effect and control sensitivity are independent of the character of the surrounding environment and the direction or magnitude of vehicle velocity therethrough.

It is another object to provide such a system which is mechanically rugged and reliable while being low in cost with regard to its manufacture, operation and maintenance.

It is another object to provide such a system which is exceedingly compact, light in weight, and which is totally encloseable within the envelope of the vehicle body.

It is another object to provide such apparatus and method which causes the dissipation of energy only during actual control use.

It is another object to provide such a system which adds significant yaw stability by damping angular velocities associated therewith.

It is another object to provide such a system the operation of which is relatively simple and natural and which inherently provides directly to the pilot operator a mechanical feedback signal whose magnitude is proportional to the actual yaw effect produced.

SUMMARY OF INVENTION

Very briefly, these and other objects are achieved in accordance with the structural aspects of one example of the invention which includes a vehicular body having an external, in this example, rotating member such as a lift producing rotary wing. Rotatably mounted within the body is a rotationally energized flywheel. Yaw control means are provided for selectively coupling the external rotating member to the flywheel for adding angular momentum thereto or for coupling the rotary member to a brake mechanism at rest with respect to the body for reducing the angular momentum of the rotary member with respect to the body. In the former case, a yaw velocity contra to the rotating member is achieved while in the latter a yaw velocity in the sense of the rotary member is effected.

Alternatively, the operation of the system may be considered to be a matter of selectively "pushing" or "pulling" on the external rotating member such that the consequent inertial reactions on the vehicle body effect a desired sense and magnitude of yaw velocity.

Further details of these and other novel features and their principles of operation as well as additional objects and advantages of the invention will become apparent and be best understood from a consideration of the following description when taken in connection with the accompanying drawings which are presented by way of an illustrative example only.

DETAILED DESCRIPTION OF A PREFERRED EMBODIMENT

Figure 1:
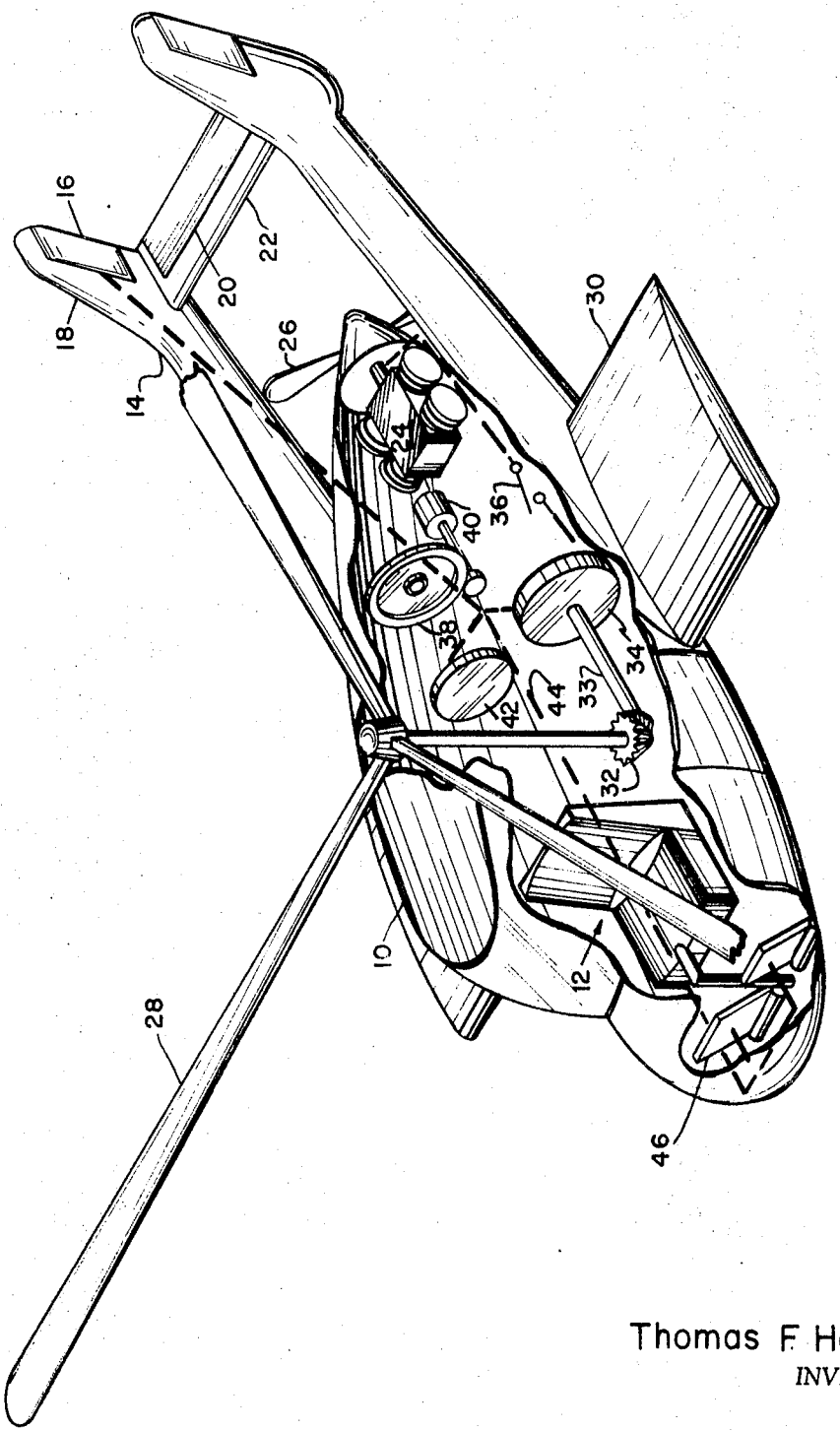
FIG. 1 is an overall view, partly cutaway perspective and partly block diagrammatic, of an example of an attitude control system constructed in accordance with the principles of the present invention.

With specific reference now to the FIGS. in detail, it is stressed that the particulars shown are by way of example and for purposes of illustrative discussion only and are presented in the cause of providing what it is believed to be most useful and readily understood description of the conceptual aspects and structural principles of the invention. In this regard, no attempt is made to show structural details of the apparatus of a presently preferred embodiment in more detail than is deemed necessary for a fundamental understanding of the invention. The description taken with the drawing will make it apparent to those skilled in the aeronautical and mechanical arts how the several forms of the invention may be embodied in practice. Specifically, the detailed showing is not to be taken as a limitation upon the scope of the invention which is defined by the appended claims forming along with the drawing, an integral part of this specification.

In FIG. 1, the example of the invention illustrated includes a vehicle air frame body 10 which is generally of the character of an autogyro having an operator-passenger position 12, a tail appendage assembly 14 including rudder and vertical stabilizer control surfaces 16, 18 and elevator and horizontal stabilizer control surfaces 20, 22 as shown. Also illustrated as carried integrally by the air frame body is a forward propulsion system including an internal combustion engine 24 and a pusher propeller arrangement 26 connected thereto in a power drive relation.

Lift is provided by an autogyro rotor assembly 28 and aerodynamically, depending upon forward velocity, by auxiliary wing appendages 30. The rotor assembly 28, in this example, is shown connected by its support shaft 31 through a right angle gear assembly 32 and a shaft 33 to a rotary coupler body 34. The rotary assembly of the rotor 28 and the coupler 34 may be freewheeling similarly to conventional autogyro rotors or, unlike the latter, may be coupled through a clutch assembly 36 to rotary power taken off the propulsion engine 24.

In typical operation, STOL performance is achieved at takeoff by thusly driving the rotor to provide nearly a liftoff condition before forward motion along the runway is permitted. The operator may then uncouple the drive by releasing the clutch 36 for subsequent operation in an autogyrolike mode. The craft is consequently airborne with little or no forward velocity and hence with little or no control surface reaction from or coation with the surrounding air. Yaw control of the craft 10 while in this mode is achieved by momentum transfer (1) between the rotary coupler body 34 and a flywheel 38 having an axis parallel to that of the coupler 34 and spun up in the same sense of rotational direction by, in this example, an electric drive motor 40 or (2) between the rotary coupler body 34 and a stationary brake disc assembly 42. With the rotor 28 revolving counterclockwise as shown, and with the flywheel spun up to a velocity effectively greater than that of the coupler body 34, case 1 causes a contra or clockwise yaw velocity while case 2 causes a counterclockwise yaw velocity. As indicated by the momentum exchange yaw system control lines 44 shown connected to the coupler 34, the flywheel 38, and the brake 42, and coupled to the rudder pedals 46 at the operator position 12, any desired rudder surface control may also be accomplished by the same operators's control means.

Figure 2:
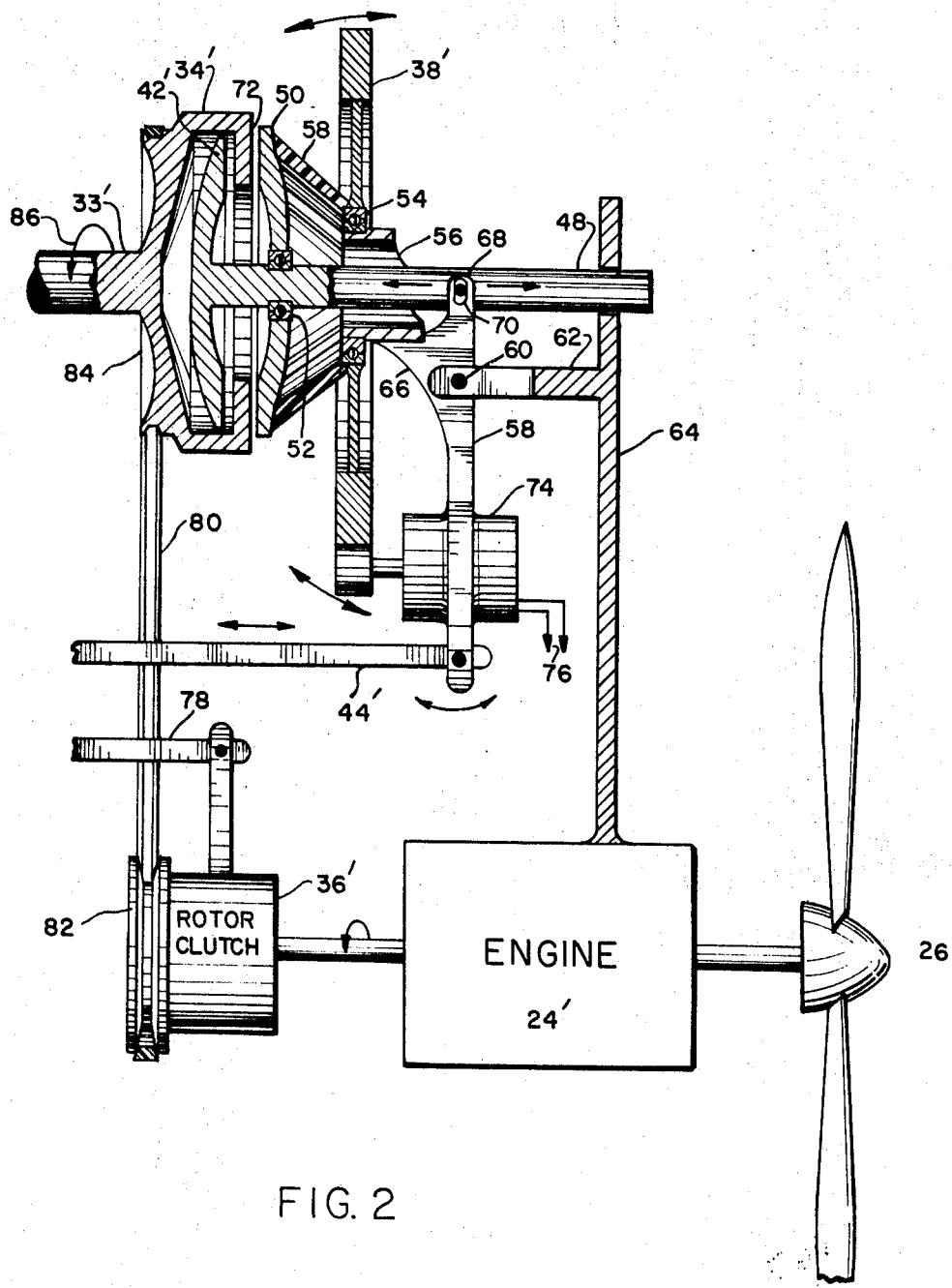
FIG. 2 is a simplified longitudinal sectional view of a portion of the apparatus indicated schematically in FIG. 1.

Referring to FIG. 2, a more detailed although still simplified diagram of an example of the mechanization of the momentum yaw control apparatus of FIG. 1 is illustrated. Primed numbers are utilized liberally to imply identification or association of actual elements with their schematic or functionally indicated counterparts in FIG. 1.

The shaft 33' is shown affixed directly to the rotary coupler body 34'; these elements may be considered axially fixed but rotationally free. Coaxially aligned with the shaft 33' and the coupler 34' is a control and support shaft 48 which may be considered as axially movable and rotationally fixed. The brake disc member 42' is shown connected directly to the end of the shaft 48. A flywheel clutch disc 50 is also carried by the shaft 48 but is free to rotate thereabout by an axial thrust supporting bearing assembly 52.

The flywheel 38' proper is rotationally mounted by a bearing assembly 54 carried by an annular journal support member 56 disposed, normally, concentrically about the control and support shaft 48. The flywheel clutch disc 50 is angularly connected to the flywheel 38' by an axially flexible coupler member assembly 58, the elements of which, in this example, are rubberlike in nature. Metallic springs, however, may also be adapted for the purpose of achieving the desired rotational coupling while permitting axial and axial pitch angular movements of the flywheel 38' and journal support member 56 with respect to the flywheel clutch disc 50.

The journal support member 56 is rigidly affixed to and carried structurally by a control arm 58 pivotally carried by and connected with a pin member 60 to a support bracket 62 affixed to the airframe body 64 as indicated. An additional extension portion 66 of the control arm 58 is coupled by a vertically slotted opening 68 to a pin element 70 carried by the nonrotating shaft 48. Thusly, longitudinal displacement of the control line linkage element 44' causes a pivotal movement of the control arm 58 about its support pin member 60 which results in an axial displacement of the shaft 48 and a tilting of the plane of rotation of the flywheel 38'.

It may be noted that the axial spacing of the annular disc coupling surfaces of the flywheel clutch disc 50 and the brake disc 42' is substantially fixed and constant independently of their mutual displacement due to any axial movement of the shaft 48. Interposed between these disc surfaces is a radially inwardly extending flangelike portion 72 of the coupler body 34'; the flangelike portion 72 having coupling surfaces juxtaposed closely to respective cooperating surfaces of the axially movable clutch 50 and brake 42'.

The flywheel is, in this example, provided with the desired magnitude of angular momentum, in the same rotational sense as the coupler body 34' by a small electric motor 74 also carried rigidly on the control arm 58 and energized through a pair of electrical leads indicated at 76. Alternatively, the flywheel may be rotated, or spun up, by ram air drive means or by coupling to the propulsion engine 24' or by a unilateral coupling from the rotor assembly 28.

Rotary energy from the engine 24' is shown coupled, in this example, to the rotary wing assembly 28 through the clutch assembly 36' controlled from the operators's position as indicated by the control linkage element 78. Power output from the clutch 36' is coupled to the rotary wing by a V-belt 80 and cooperating, aligned pulley portions 82,84 of the clutch and rotary coupler body 34', respectively.

In a typical mode of STOL operation, the craft 10 with the engine 24 running and coupled through the clutch 36' to the rotary wing to achieve a near liftoff condition is permitted to accelerate forwardly by control of propeller pitch or brakes or both; then power coupling to the rotary wing may terminate. With the additional lift created by the forward motion, the craft quickly becomes airborne. Direction change or control at this stage is achieved by the momentum yaw control system as described above by coupling the rotary wing to either the brake disc 42' or the flywheel 38'. It may be noted that when the rotary wing is free wheeling, and in the absence of cross wind or other external forces, the rotary coupler body 34 may be maintained free from any momentum coupling. Furthermore, it may be desirable, under conditions of sufficient forward air speed, to trim or directionally control the craft by use of the rudder or rudder trim surfaces.

To understand the feedback mechanical signal provided to the operator, it may be noted that when the heading of the craft is changed to the left or right, the flywheel 38' tends to precess and pivot about the pin member 60 sending a force signal along the linkage 44' to the operator. With the direction of rotation of the flywheel indicated by the arrow at 86, an operator applied force to the left (as viewed in the drawing) in the linkage 44' causes a movement to the right in the shaft 48 resulting in a coupling of the rotary body 34' to the brake disc 42' and a consequent change of heading to the left or "with" the rotary sense of the rotary wing. This leftward swing of the craft heading causes a forwardly downward precession pitch of the flywheel 38' causing a force in the linkage 44' to the right, i.e. opposing the original operator force.

It may be seen that the reverse case, i.e. a swing in heading to the right causes a forwardly, upward precession of the flywheel and a resultant operator felt force to the left in the linkage 44'.

A result of the above described feedback system is a yaw velocity, due to operator applied force, which is substantially, directly proportional to that applied force. Additionally, with the operators's controls free, this gyroscopic feedback action tends to damp any spurious yaw velocity effects.

There have thus been disclosed and described, a number of structural and method aspects of an example of an orientation control system and method which achieves the objects and exhibits the advantages set forth hereinabove. Again it is stressed that the specification and drawings set forth merely an example of the conceptual aspects of the invention; many other examples and other modes of operation of embodiments of the invention are within the scope of the following claims.

I claim:

1. Vehicle attitude control apparatus comprising:
   vehicle body;
   rotatable assembly carried by said body and having, when rotating, a component of angular momentum of predetermined sense and parallel to a predetermined attitude control axis;
   rotatable inertial means carried by said body;
   driving means coupleable to said inertial means for imparting thereto a predetermined magnitude of angular momentum;
   braking means carried by said body; and
   first control means carried by said body for selectively, disjunctively, and variably coupling said rotatable assembly to said rotatable inertial means and said braking means,
   said control means and said riving means being of the character to cause the absolute addition of angular momentum to said rotatable assembly, with respect to said body, when said rotatable inertial means is coupled to said rotatable assembly,
   said rotatable assembly including external rotary wing means for providing lift for said vehicle in a coacting fluid,
   said rotatable inertial means including flywheel means having, when rotating, a predetermined angular momentum, said rotatable assembly including a rotary coupler body disposed internally of said body, coupled to said external rotary wing means, and having, when rotating, at least a component of angular velocity parallel to and of the same sense as that of said flywheel means, and said driving means being of the character to impart to said flywheel means a magnitude of angular velocity such as to enable said absolute addition of momentum from said flywheel means to said rotary coupler body,
   said braking means including stationary, energy dissipating means disposed internally of said vehicle body and being variably coupleable by said control means to said rotary coupler body,
   the axis of said flywheel means and that of said rotary coupler body being substantially orthogonal to said predetermined attitude control axis, and said flywheel means including a flywheel having an axis, a flywheel clutch disc, axially flexible means for rotationally intercoupling them, and mounting means for said flywheel which is of the character to permit a predetermined magnitude of pitch rotation of said flywheel axis with respect to said rotary coupler body axis.

2. The invention according to claim 1 in which said control means includes force coupling linkage means connected to an operators's position in said vehicle body and which further includes precession force coupling means for coupling displacement effects due to said flywheel pitch rotation to said force coupling linkage means.

3. The invention according to claim 2 which further includes rotary forward propulsion means carried by said vehicle body and rotor drive control means for selectively coupling said propulsion means to said rotatable assembly in a positive drive relation therewith and in which said rotor drive control means comprises a clutch assembly having operation control means connected thereto and disposed at said operators's position.